July 14, 1936.                G. C. MATSON                2,047,379
MOLDING DIE
Filed Jan. 11, 1934

INVENTOR
G. C. MATSON
BY H. A. Whitehorn
ATTORNEY

Patented July 14, 1936

2,047,379

UNITED STATES PATENT OFFICE 2,047,379

MOLDING DIE

George C. Matson, Brookfield, Ill., assignor to Western Electric Company, Incorporated, New York, N. Y., a corporation of New York Application January 11, 1934, Serial No. 706,186

2 Claims. (Cl. 18—42)

This invention relates to a molding die, and more particularly to a die for molding threaded articles.

An object of the invention is to provide an efficient and practical die for molding articles and simultaneously forming threads on the articles.

In accordance with the object, one embodiment of the invention contemplates the provision of a movable mold section carrying a plunger recessed to form a portion of a mold cavity, a fixed mold section recessed to receive the plunger and to form another portion of the mold cavity, an element threadedly disposed in the fixed mold section for forming the interior of the article and for forming threads thereon, means for rotating the element for removing it from the article when finished, and means for removing the article from the mold cavity.

Figure 1:
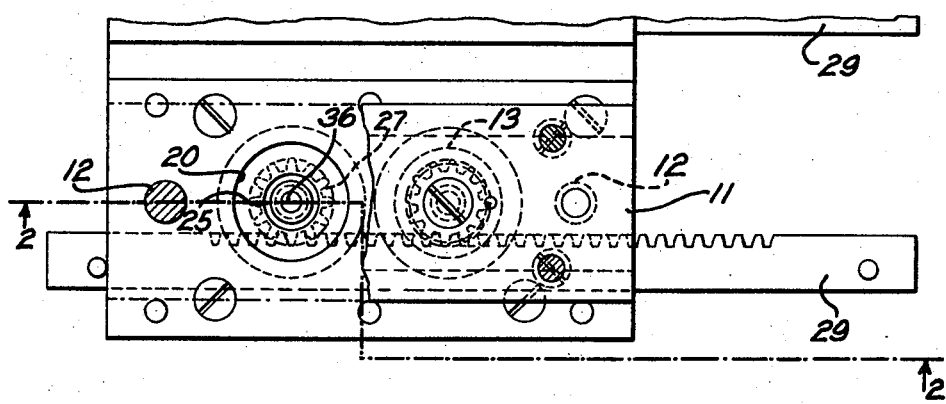
Figure 2:
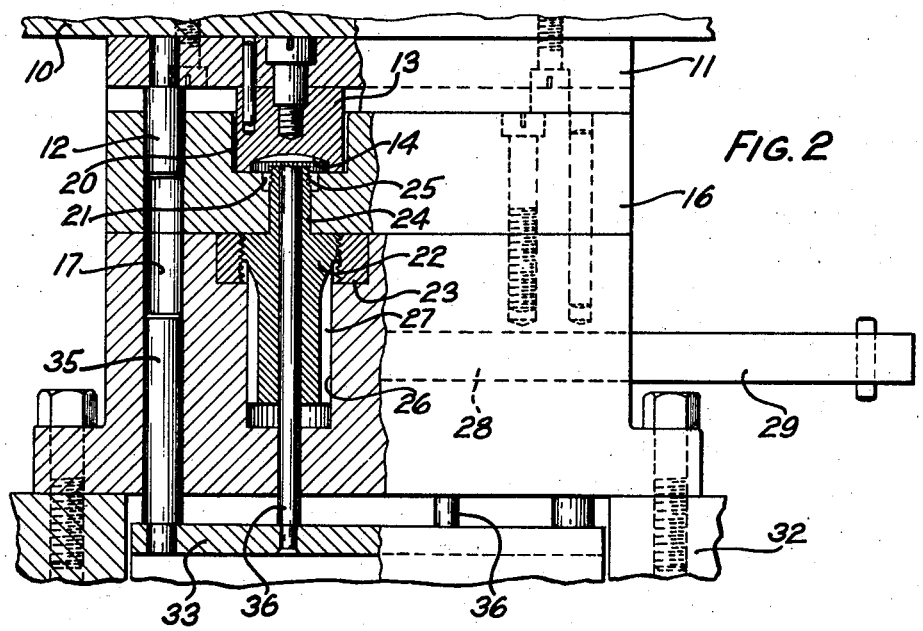

Other objects and advantages will be apparent from the following detailed description, taken in conjunction with the accompanying drawing, wherein Fig. 1 is a top plan view of a molding die illustrating the invention, portions thereof being broken away, and Fig. 2 is a vertical sectional view taken along the line 2—2 of Fig. 1.

Referring now to the drawing wherein like reference numerals designate similar parts and which illustrates the invention applied to apparatus for molding caps for collapsible tubes, numeral 10 designates a movable portion of a molding press to which is secured a movable mold section 11 carrying near the ends thereof guide pins 12 for a purpose hereinafter described. As illustrated in Fig. 1 of the drawing a molding die consists of a plurality of units and each unit is capable of molding two articles simultaneously. In view of the fact that the article molding mechanism for molding each article is identical, the description of one mechanism will apply equally well to each of the others.

Fig. 2 illustrates a plunger 13 fixed to the movable mold section 11 and recessed at 14 to form a portion of the mold cavity. A fixed mold section 16 consisting of two parts secured to each other has disposed at each end thereof vertically extending apertures 17 arranged to receive the guide pins 12 in the upper ends thereof. The fixed mold section 16 is recessed at 20 to receive the plunger 13 and to form a portion 21 of the mold cavity. A movable element 22 is threadedly connected to a fixed rim 23 disposed in the fixed mold section 19 and has a reduced portion 24 which extends upwardly through an aperture in the upper portion of the section 16 and into the mold cavity where its upper end is provided with threads 25. The lower portion of the element 22 is rotatably and reciprocably disposed in an aperture 26 of the fixed mold section 16 and has elongated teeth 27 formed on its peripheral surface which interengage teeth 28 of a horizontally movable rack 29. The rack 29 is slidably disposed in a horizontally extending aperture in the fixed mold section 16 and is operated by any suitable power means not shown. The fixed mold section 16 is mounted upon the stationary base 32 of the molding press. Positioned beneath the fixed mold section 16 is an ejecting plate 33 mounted upon a reciprocable ejecting mechanism (not shown) of the molding press. Fixed to the ejecting plate 33 and extending vertically therefrom are guide pins 35 movably disposed in apertures 17, and ejecting plungers 36 extending through apertures in the fixed mold section 16 and through the centers of the members 22. The ejecting plunger 36, which is illustrated at the left (Fig. 2), extends upwardly to a position where its upper end terminates flush with the upper end of the element 22 where it remains during the molding operation.

The article may be molded of any suitable material as, for example, phenol plastic material which is originally in powder form. In molding the articles of such material, the mold may be heated and subsequently cooled in any desired manner, and the means for heating and cooling the mold is not shown in the drawing for the purpose of clearness and simplicity.

In preparing the mold for a molding operation, the rack 29 is moved to the farthest position to the left (Fig. 2) and while the mold is open a suitable quantity of the powdered material is disposed in the mold cavity 21 and the recess 20. The element 22 is in its uppermost position and the ejecting plunger 36 has its upper end flush with the upper end of the element 22. The movable portion 10 of the press is then moved downwardly moving the movable mold section 11 with it and forcing the plunger 13 into the recess 20 to the position shown in Fig. 2. The mold is then (or previously) heated to a desired temperature to cause the powdered material, which in the present instance is a composite material such as a powdered phenol condensation product, to flow under the pressure of the plunger and to completely fill the die cavity. When using a molding material of the type just mentioned the heat and pressure are maintained for a sufficient length of time to cure the material. The heating means (not shown) is then rendered ineffective and a cooling means (not shown) is rendered effective for cooling the mold.

After the mold is cooled, the rack 29 is moved to the right (Fig. 2) causing a counterclockwise rotation of the element 22, as viewed from the top resulting in the unscrewing and removal of the element 22 from the molded article. The element 22 is guided in its downward movement by the walls of the aperture 26 and is moved clear of the article by its threaded connection with the ring 23 so that the article will not be damaged during the removal of the element 22. The portion 25 and the collar 23 have the same number of threads per inch in order to bring about this result. The movable portion 10 of the press is then moved upwardly carrying with it the movable mold section 11 of the mold together with the plunger 13 removing the plunger from the article and spacing it a sufficient distance above the fixed mold section 16 of the mold so that the article may be readily ejected and removed from the mold. The ejecting member of the press is then moved upwardly moving with it the ejecting plate 33 and the ejecting plunger 36, the action of the latter forcing the article from the mold cavity 21 and moving it to a position so that any suitable receiving means (not shown) may engage the article and remove it to a container.

Only a portion of one unit of the mold has been described in detail, but as illustrated in Fig. 1 a plurality of molding units may be operated simultaneously for molding a plurality of articles Each rack 29 is capable of actuating a plurality of the threaded elements 22, and a plurality of these racks may be simultaneously actuated so that all of the articles made in one assembly may be simultaneously ejected.

Although a specific form of mold has been described as being capable of molding phenol plastic articles, it should be understood that the mold is capable of other modifications and adaptations without departing from the spirit and scope of the appended claims.

What is claimed is:

1. In a mold, separable mold sections cooperating to form a mold cavity and having provision respectively for connection to the movable and fixed portions of a press, an externally threaded element extending into the cavity for forming internal threads on the article to be molded, said element being connected to one of said die sections by threads of the same pitch at a point in close proximity to the mold cavity, said element being longitudinally apertured, an ejector in said aperture, means for rotating said threaded element to withdraw it from the article, and means more remote from the die cavity for operating said ejector.

2. In a multiple mold, separable mold sections having cooperating portions forming a plurality of mold cavities, and having threaded elements extending into the cavities for forming threads on the articles to be molded, said elements being connected to one of said die sections by threads of the same pitch at points in close proximity to the cavities, and means for withdrawing the elements from the articles comprising an axially elongated pinion closely adjacent to the second mentioned threads on each element and a common actuating rack whereby upon actuation of the rack the pinions move axially without becoming disengaged from the racks.

GEORGE C. MATSON.